United States Patent
Kendall et al.

(10) Patent No.: US 6,800,170 B2
(45) Date of Patent: Oct. 5, 2004

(54) METATHESIS POLYMERIZATION ADHESIVES AND COATINGS

(75) Inventors: Jonathan L. Kendall, Apex, NC (US); Kenneth C. Caster, Apex, NC (US)

(73) Assignee: Lord Corporation, Cary, NC (US)

(*) Notice: Subject to any disclaimer, the term of this patent is extended or adjusted under 35 U.S.C. 154(b) by 85 days.

(21) Appl. No.: 10/389,848

(22) Filed: Mar. 17, 2003

(65) Prior Publication Data

US 2003/0230598 A1 Dec. 18, 2003

Related U.S. Application Data

(62) Division of application No. 09/888,793, filed on Jun. 25, 2001.

(51) Int. Cl.[7] .............................. C09J 4/00; C09J 119/00
(52) U.S. Cl. ..................... 156/334; 525/332.1; 526/171; 526/348; 526/280; 526/281; 526/335; 428/420; 427/508

(58) Field of Search .................... 156/334; 525/332.1; 526/171, 348, 280, 281, 335; 428/420, 500; 427/508

(56) References Cited

U.S. PATENT DOCUMENTS 6,409,875 B1 * 6/2002 Giardello et al. ........... 156/334

* cited by examiner

*Primary Examiner*—Robert D. Harlan
(74) *Attorney, Agent, or Firm*—Miles B. Dearth

(57) ABSTRACT

An adhesive or coating composition prepared by mixing together at least one metathesizable highly-reactive cycloolefin (e.g., a norbornadiene) and a metathesis catalyst. The use of highly-reactive cycloolefins can provide exceptional adherence to a low-surface-tension substrate. Another embodiment is a two-part adhesive or coating system wherein the first part includes at least one first metathesizable material, and the second part includes at least one liquid metathesis oligomer or polymer and a metathesis catalyst.

16 Claims, No Drawings

METATHESIS POLYMERIZATION ADHESIVES AND COATINGS

This application is a divisional of pending U.S. patent application Ser. No. 09/888,793, filed Jun. 25, 2001.

FIELD OF THE DISCLOSURE

The disclosed embodiments relate to adhesive and coating compositions and adhesive- and coating-dispensing systems, particularly catalytically-reactive adhesives and coatings.

BACKGROUND

A continuing need exists for adhesives and coatings that have robust adhesion to a variety of different types of substrates. Adhesion to low-surface-tension substrates such as polypropylene, polyethylene, cured ethylene-propylene-diene terpolymer rubber ("EPDM") or thermoplastic elastomers is particularly problematic. In order to be commercially viable, adhesives and coatings must have certain characteristics in addition to superior bonding strength. Paramount among these characteristics is ease of dispensing from conventional systems, adequate open time, and sufficient shelf life.

In addition, a particular need exists for environmentally acceptable adhesives and coatings that avoid the use of volatile organic solvents. It has thus far been relatively difficult to develop environmentally acceptable adhesives and coatings that perform at a level equal to traditional solvent-based adhesives and coatings. For example, one major problem associated with bonds formed from an aqueous adhesive or coating is the relative susceptibility of the bonds to high temperature fluids and corrosive materials. A further need exists for coatings or adhesives that can be applied with relatively few steps and minimal energy use.

Adhesives used to join large surface area substrates are even more challenging since the adhesive must be able to withstand the exceptionally high stresses and adverse environmental conditions placed on the adhesive joint. Such adhesives are commonly referred to as "structural" adhesives and typically are used to join together two structural members such as metal and plastic substrates in the fabrication, repair and reconstruction of automotive and truck vehicle bodies and component panels and parts such as doors, roofs and hoods.

Metathesis polymers are one class of polymers that have not been exploited commercially in the adhesive or coating fields. Metathesis polymerization of olefin monomers is generally known and typically yields polymers having an unsaturated linear backbone. The degree of unsaturation functionality of the repeat backbone unit of the polymer is the same as that of the monomer. For example, with a norbornene reactant, the resulting polymer should have a structure represented by:

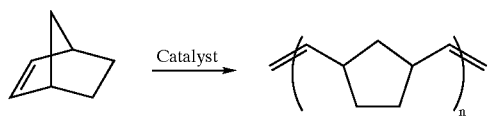

Adhesives and coatings are briefly mentioned in a few disclosures pertaining to metathesis polymers.

For example, PCT Patent Application Publication No. WO 97/38036 describes a metathesizable composition that includes a mixture of a thermal carbene-free ruthenium catalyst and a thermal ruthenium carbene catalyst. The polymers resulting from the metathesis polymerization are said to be suitable "as adhesives for bonding substrates having low surface energies (for example Teflon, polyethylene, polypropylene)." The compositions disclosed in WO 97/38036 are also said to be useful as "thermally curable adhesives" and as protective coatings on substrates. However, there is no example of a specific adhesive or coating formulation.

The metathesizable component in the compositions of WO 97/38036 may be a cycloolefin. Various structural formulae for cycloolefins are disclosed that encompass hundreds, if not thousands, of possible cycloolefin compounds. Norbornene per se, norbornene derivatives and norbornadiene are included in the lengthy list of possible cycloolefins, but only norbornene derivatives and polycyclic norbornenes (e.g., dicyclopentadiene) are used in the exemplified embodiments. Similar to the cycloolefin disclosure, WO 97/38036 discloses various structural formulae for each of the catalysts that encompass a myriad number of specific catalyst compounds. One of the possible catalysts is $Cl_2[P(C_6H_{11})_3]_2Ru(IV)=CH-C_6H_5$ and it is used in the examples of WO 97/38036 (identified as "catalyst B"). However, these examples all describe using catalyst B and a cycloolefin monomer to make a molded article. Moreover, in comparative examples with catalyst B alone (i.e., it is not mixed with a carbene-free ruthenium catalyst) the disclosed results indicate that the composition incompletely polymerized or produced a soft solid.

SUMMARY OF THE DISCLOSURE

The disclosed adhesive and coating compositions are tailored to have certain practical properties that are important for a commercial adhesive. For example, the compositions are sufficiently stable under normal ambient conditions so that they can be prepared and then stored for an extended period prior to their use. Common adhesive or coating dispensing systems can easily be used to dispense and apply the adhesive compositions to a substrate. The compositions are environmentally acceptable. Finally, the compositions display remarkable bonding or adhesion strength, particularly for low-surface-tension substrates such as polypropylene and polyethylene.

In particular, according to one embodiment there is disclosed an adhesive or coating composition prepared by mixing together at least one metathesizable material comprising a highly-reactive cycloolefin (e.g., a norbornadiene) and a metathesis catalyst. It has been found that a highly-reactive cycloolefin can provide exceptional adherence to a low-surface-tension substrate. The metathesis catalyst may be a metal carbene catalyst having a structure described below. It has also been found that metal carbene catalysts that include trialkylphosphine or imidazol-2-ylidene can provide especially effective adhesives or coatings. Also disclosed is a method for adhering together at least two substrates, or coating a substrate, with this composition.

According to additional embodiments, the adhesive or coating composition may include at least two different metathesizable materials. In one variant, a norbornadiene may be at least one of the metathesizable materials. In a second variant, a composition can be prepared by mixing together a cycloolefin monomer and a liquid metathesis oligomer or polymer.

According to certain embodiments, the adhesive or coating composition can be provided as a two-part reactive system. In other words, there may be a first composition or part and a second composition or part that are independently prepared and stored separately until time of use. When used, the first and second parts are mixed together and undergo a reaction to make an adhesive or coating that is then applied to a substrate. Typically, the two parts are mixed together shortly before applying the adhesive or coating to the substrate.

One particular embodiment of a two-part reactive system includes (a) a first part comprising at least one first metathesizable material, and (b) a second part comprising (i) at least one liquid metathesis oligomer or polymer and (ii) a metathesis catalyst. The second part may be prepared by mixing together a metathesis catalyst and at least one metathesizable monomer that forms a liquid metathesis oligomer or polymer in the presence of the metathesis catalyst. It has been found that liquid metathesis oligomers or polymers are superior carriers for the metathesis catalyst for reasons detailed below. Also disclosed are methods for adhering at least two substrates together, or coating a substrate, using such a two-part system.

There are also disclosed particular systems for dispensing the two-part adhesive or coating that includes a first container containing a first composition comprising at least one metathesizable material wherein the first composition has a viscosity of at least about 10 cP at 25° C., a second container containing a second composition comprising a metathesis catalyst wherein the second composition has a viscosity of at least about 10 cP at 25° C., means for displacing the first composition from the first container, means for displacing the second composition from the second container, and a member that includes (i) elements that mix together the first composition and the second composition to produce an adhesive or coating and (ii) an orifice through which the adhesive or coating exits onto a substrate.

The foregoing features and advantages will become more apparent from the following detailed description of several embodiments that proceeds with reference to the accompanying figures.

DETAILED DESCRIPTION OF SEVERAL EMBODIMENTS

Unless otherwise indicated, description of components in chemical nomenclature refers to the components at the time of addition to any combination specified in the description, but does not necessarily preclude chemical interactions among the components of a mixture once mixed.

The following definitions are provided for ease of understanding and to guide those of ordinary skill in the art in the practice of the embodiments.

"ADMET" means acyclic diene olefin metathesis.

"Coating" encompasses a coating that is intended to be the final or outer coating on a substrate surface and a coating that is intended to be a primer for a subsequent coating.

"Highly-reactive cycloolefin" encompasses cycloolefins that polymerize in the presence of a metathesis catalyst at such a rate that self-heating and consequential reaction acceleration occur during polymerization. For illustrative purposes only, a highly-reactive cycloolefin may polymerize in less than about 120 seconds. Highly-reactive cycloolefins tend to be those with high ring strain energies, a high number of reactive sites and that lack functional groups that interfere with polymerization.

"Liquid metathesis oligomer or polymer" encompasses any oligomer or polymer that exists in liquid or paste form at room temperature and is prepared from at least one metathesizable monomer.

"Low-surface-tension substrate" includes any substrate material that includes at least one surface having a low surface tension. For example purposes only, a low surface tension may mean a surface tension of less than or equal to about 38 dynes/cm at 20° C. Polyethylene, polypropylene, and polytetrafluoroethylene are examples of low-surface-tension substrates.

"Metathesizable material" denotes a material that is capable of undergoing a metathesis reaction.

"Normal ambient conditions" denotes temperatures typically found in minimal atmosphere control workplaces (for example, about −20° C. to about 40° C.), pressure of approximately 1 atmosphere and an air atmosphere that contains typical quantities of moisture and oxygen.

"Open time" means the amount of time after initiation of the metathesis polymerization (e.g., when the metathesizable material is mixed with an active catalyst) and before the adhesive composition reaches a cure stage beyond which the composition is unworkable.

"ROMP" means ring-opening methathesis polymerization.

"Room temperature" denotes about 10° C. to about 40° C., typically about 20° C. to about 25° C.

As described above, certain disclosed embodiments contemplate a two-part adhesive or coating system. For ease of reference, the part that includes the metathesis catalyst is referred to herein as "part B" and the other part is referred to as "part A".

The above-described adhesive or coating compositions generally include at least one metathesizable material and a metathesis catalyst. Combining the metathesis material and the metathesis catalyst together effects a metathesis polymerization that contributes to the bonding properties of the disclosed compositions. In other words, the disclosed compositions are reactive adhesives or coatings in the sense that substrate bonding or adhesion occurs due to a chemical reaction. Metathesis reactions useful in the disclosed embodiments can be a cross-metathesis reaction, an ADMET, a ring-closing metathesis reaction or, preferably, a ROMP. These types of metathesis reactions are described, in general, in Ivin, K. J. and Mol, J. C., *Olefin Metathesis and Metathesis Polymerization* (Academic Press 1997).

The metathesizable material may be a monomer, oligomer, polymer, or mixtures thereof. Suitable metathesizable materials include those that have at least one metathesis reactive functional group such as olefinic materials. The metathesizable material or component can have a metathesis reactive functionality ranging from 1 to about 1000, particularly from about 1 to about 100, more particularly from about 1 to 10, mol metathesizable functional group/mol molecule of metathesizable material. In addition, materials capable of undergoing ROMP typically have "inherent ring strain" as described in Ivin et al. at page 224, with relief of this ring strain being a driving force for the polymerization. Materials capable of undergoing ADMET typically have terminal or near-terminal unsaturation.

Illustrative metathesizable materials are those that include an unsaturated functional group such as ethene, α-alkenes, acyclic alkenes (i.e., alkenes with unsaturation at β-position or higher), acyclic dienes, acetylenes, cyclic alkenes and cyclic polyenes. According to particular embodiments, the metathesizable material may be a cyclic alkene or a cyclic polyene, especially a cycloolefin. When cyclic alkenes or polyenes are the metathesizable material, the metathesis reaction is a ROMP.

A monomer or oligomer may be particularly useful as the metathesizable material. Illustrative monomers include cycloolefins such as norbornene, norbornadiene, cycloalkenes, cycloalkadienes, cycloalkatrienes, cycloalkatetraenes, aromatic-containing cycloolefins and mixtures thereof. Illustrative cycloalkenes include cyclooctene, hexacycloheptadecene, cyclopropene, cyclobutene, cyclopentene, cyclohexene, cycloheptene, cyclononene, cyclodecene, cyclododecene, paracyclophene, and ferrocenophene. Illustrative cycloalkadienes include cyclooctadiene and cyclohexadiene. Illustrative cycloalkatrienes include cyclooctatriene. Illustrative cycloalkatetraenes include cyclooctatetraene.

According to certain embodiments, the metathesizable material may be a norbornene, norbornadiene or cyclobutene. As used herein, "norbornene" means any compound that includes a norbornene ring moiety, including norbornene per se, substituted norbornenes, and polycyclic norbornenes as shown below, for example, in formulae A–D. "Substituted norbornene" means a compound with a norbornene ring moiety and at least one substituent group as shown below, for example, in formula A. "Polycyclic norbornene" mean a compound with a norbornene ring moiety and at least one additional fused ring as shown below, for example, in formulae C and D.

As used herein, "norbornadiene" means any compound with a norbornadiene ring moiety as shown below, for example, in formula B. Norbornadiene includes substituted norbornadienes and polycyclic norbornadienes. "Substituted norbornadiene" means a norbornadiene compound having at least one substituent group. "Polycyclic norbornadiene" means a norbornadiene compound having at least one additional fused ring.

As used herein, "cyclobutene" means any compound that includes a cyclobutene ring moiety, including cyclobutene per se, substituted cyclobutenes, and polycyclic cyclobutenes as shown below, for example, in formula E. "Substituted cyclobutene" means a compound with a cyclobutene ring moiety and at least one substituent group. "Polycyclic cyclobutene" mean a compound with a cyclobutene ring moiety and at least one additional fused ring.

Illustrative norbornenes, norbornadienes and cyclobutenes include those having structures represented by the following formulae:

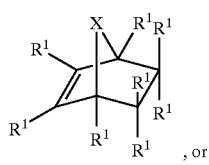
Formula A

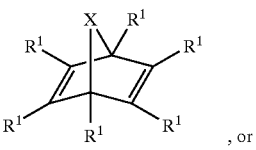
Formula B

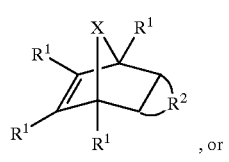
Formula C

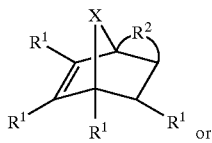
Formula D

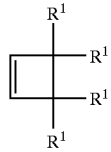
Formula E wherein X is $CH_2$, $CHR^3$, $C(R^3)_2$, $C=C(R^3)_2$, O, S, N—$R^3$, P—$R^3$, O=P—$R^3$, $Si(R^3)_2$, B—$R^3$ or As—$R^3$; each $R^1$ is independently H, $CH_2$, alkyl, alkenyl (such as vinyl, allyl, oralkylidenyl), cycloalkyl, cycloalkenyl, aryl, alkaryl, aralkyl, halogen, halogenated alkyl, halogenated alkenyl, alkoxy, oxyalkyl, carboxyl, carbonyl, amido, (meth) acrylate-containing group, anhydride-containing group, thioalkoxy, sulfoxide, nitro, hydroxy, keto, carbamato, sulfonyl, sulfinyl, carboxylate, silanyl, cyano or imido; $R^2$ is a fused aromatic, aliphatic or heterocyclic or polycyclic ring; and $R^3$ is hydrogen, alkyl, alkenyl, cycloalkyl, cycloalkenyl, aryl, alkaryl, aralkyl or alkoxy. The carbon-containing R groups may have up to about 20 carbon atoms. According to a particular embodiment, X may be $C=C(R^3)_2$.

Illustrative norbornadienes include 2,5-norbornadiene (referred to herein as "NBD"), 2-propyl-2,5-norbornadiene, 2-ethyl-2,5-norbornadiene, 1,4-bis[2-(2,5-norbornadienyl)] butane, 1-methyl-2,5-norbornadiene, 7-isopropylidene-2,5-norbornadiene, and 7-sec-butylidene-2,5-norbornadiene.

Exemplary substituted norbornenes include dicyclopentadiene, methylidenenorbornene, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, ethylidenenorbornene, 5-dodecyl-2-norbornene, 5-isobutyl-2-norbornene, 5-octadecyl-2-norbornene, 5-isopropyl-2-norbornene, 5-phenyl-2-norbornene, 5-p-toluyl-2-norbornene, 5-α-naphthyl-2-norbornene, 5-cyclohexyl-2-norbornene, 5-isopropenyl-norbornene, 5-vinyl-norbornene, 5,5-dimethyl-2-norbornene, 5-norbornene-2-carbonitrile, 5-triethoxysilyl-2-norbornene, 5-norborn-2-yl acetate, 7-oxanorbornene, 5-norbornene-2,3-carboxylic acid, 5-norbornene-2,2-dimethanol, 2-benzoyl-5-norbornene, 5-norbornene-2-methanol acrylate, 5,6-di(chloromethyl)-3-norbornene, 2,3-hydroxymethyl-5-norbornene di-acetate and their stereoisomers and mixtures thereof.

Exemplary polycyclic norbornenes include tricyclic monomers such as dicyclopentadiene and dihydrodicyclopentadiene, tetracyclic monomers such as tricyclopentadiene, pentacyclic monomers such as tetracyclopentadiene and tetracyclododecene, hexacyclic monomers such as pentacyclopentadiene, heptacyclic monomers such as hexacycloheptadecene, and the corresponding substituted polycyclic norbornenes.

Exemplary substituted cyclobutenes include 3-methylcyclobutene, 3-ethylcyclobutene, 3-propylcyclobutene, 3,3-dimethylcyclobutene, 3,3-diethylcyclobutene, 3,3-dipropylcyclobutene, 3,4-dimethylcyclobutene, 3,4-diethylcyclobutene, 3,4-dipropylcyclobutene, 3,4-diisopropylcyclobutene, 3,4-di(methoxymethyl)cyclobutene, bicyclo[4.2.0]oct-7-ene, bicyclo[6.2.0]dec-9-ene, and bicyclo[3.2.0]hept-6-ene.

Structures of exemplary norbornenes and other cycloolefins are shown below.

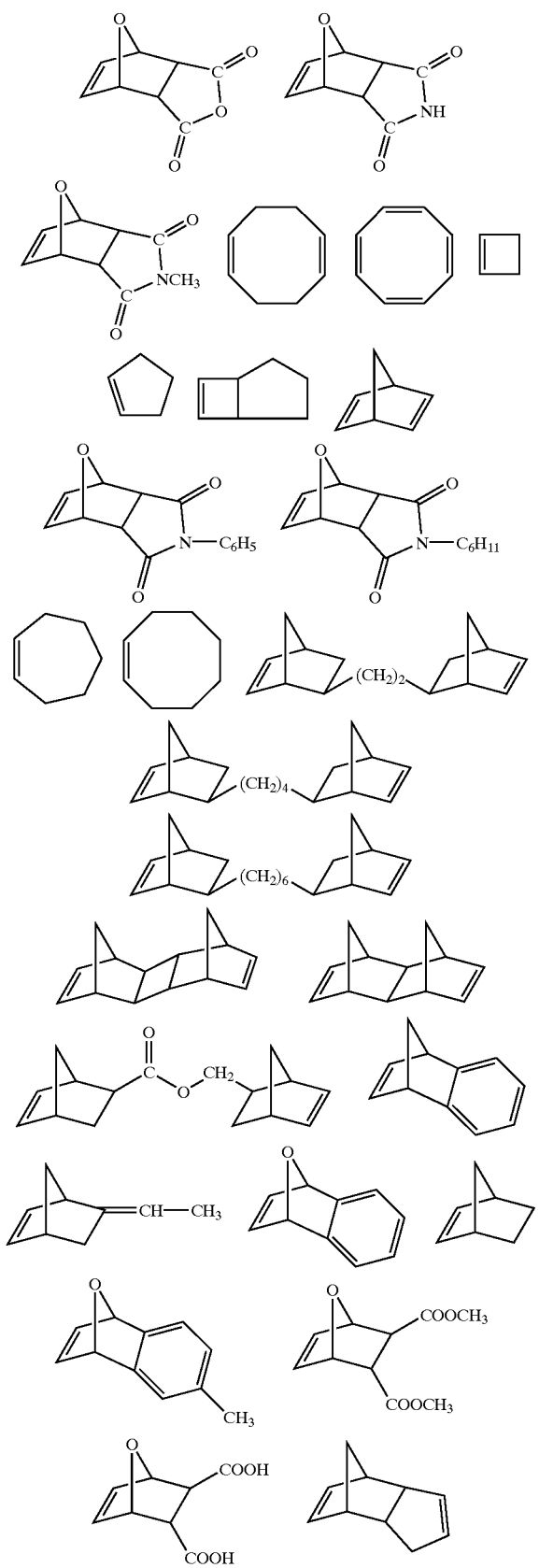
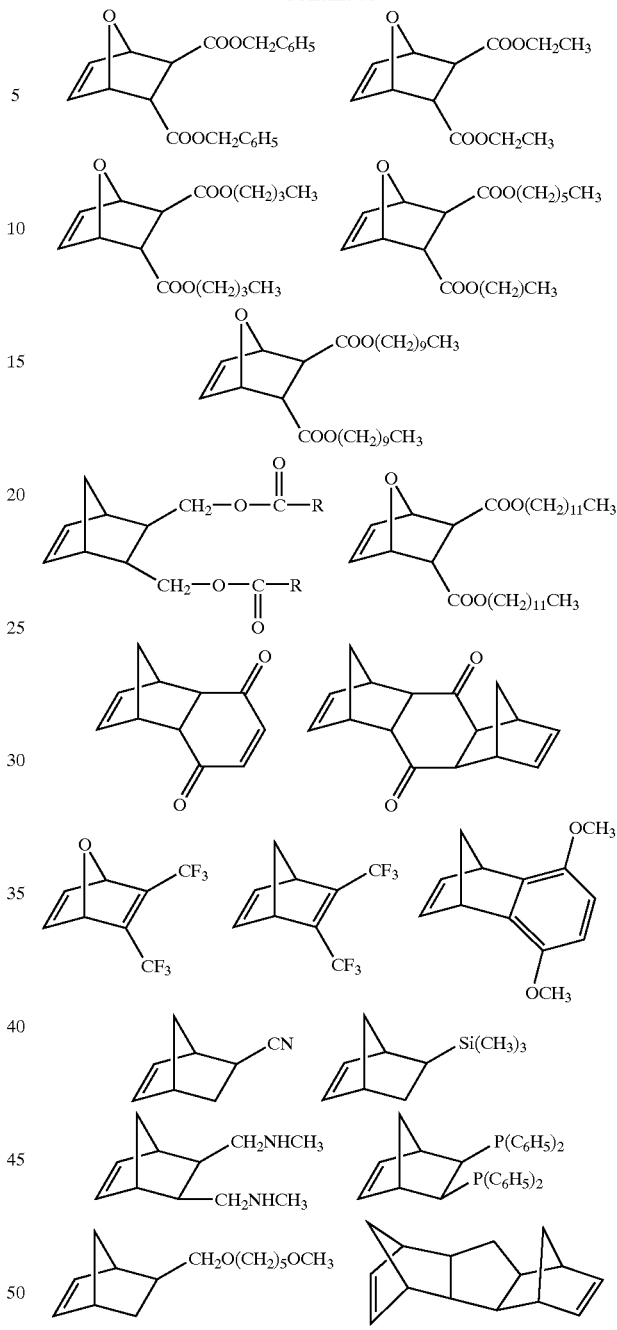

It has been found that highly-reactive cycloolefins may be especially useful as a metathesizable material in reactive adhesives or coatings since formulations with such cycloolefins can provide exceptional adhesive strength. Illustrative highly-reactive cycloolefins include norbornadiene, norbornene and cyclobutene. Less reactive monomers such as cis-cyclooctene generally provide weaker adhesive performance.

However, norbornadiene per se by itself (i.e., as the only metathesizable material in the formulation) tends to polymerize very quickly (e.g., about 1 to about 5 seconds), thus limiting its practical application. Accordingly, it can be useful to include with the norbornadiene material at least one other metathesizable material that decreases the polymerization rate of the overall mixture without significantly impacting the bonding strength. An illustrative combination is NBD/ethylidenenorbornene (particularly 5-ethylidene-2-norbornene monomer (referred to herein as "ENB")). The amount of norbornadiene material based on the total amount of all metathesizable material in a specific formulation (including metathesizable material in both parts in a two-part system) may vary.

The metathesizable monomer or oligomer may be used by itself in a substantially pure form or technical grade. As used herein, "technical grade" means a solution that includes at least about 90 weight % monomer or oligomer. The advantage of using a technical grade is that the adhesive or coating composition can be approximately 100% reactive. Thus, there are no workplace or environmental problems caused by volatile organic compounds or performance problems caused by non-reactive additives and there is no need for purification.

The metathesizable monomer or oligomer also can be included in a mixture with other components or it can be substantially diluted with a solvent or carrier fluid. For example, the metathesizable monomer can be dissolved or dispersed in conventional organic solvents such as cyclohexane, methylene chloride, chloroform, toluene, tetrahydrofuran, N-methylpyrrolidone, methanol, ethanol or acetone or in water.

According to particular embodiments of the two-part system, at least one liquid metathesizable monomer is included in part A. However, it has been found that the viscosity of the metathesizable monomer by itself may be too low for such desirable characteristics as low sag and flow control during application via the dispensing systems described below in more detail. In these cases, it may desirable to increase the viscosity of part A. As mentioned above, according to certain embodiments part A of a two-part system may have a viscosity of at least about 10 cP at 25° C.

One option for increasing the viscosity of part A involves mixing the metathesizable monomer(s) or oligomer(s) with a polymer such as a polyolefin, polyester, polyurethane, polycarbonate, epoxy or acrylic (referred to herein as a "thickening polymer"). For example, a liquid or solid metathesizable monomer/oligomer may be mixed (e.g., dispersed or dissolved) with the thickening polymer. Alternatively, a solid polymer may be dissolved or dispersed in a liquid metathesizable monomer/oligomer. Illustrative examples of a thickening polymer additive include elastomers such as halogenated polyolefins (e.g., polychloroprene and chlorosulfonated polyethylene); homopolymers of butadiene; copolymers of butadiene and at least one monomer copolymerizable therewith such as styrene and acrylonitrile; polyisoprene; styrene-isoprene copolymer; butadiene elastomers modified by reaction with (meth)acrylic acid, maleic anhydride, fumaric acid or an isocyanate; and ethylene-propylene-diene elastomers. The elastomer may also be a toughening agent that provides improved impact and shatter resistance to the cured adhesive or coating and decreases the brittleness of the cured adhesive or coating. In addition, the thickening polymer additive may also contain metathesizable functionalities that would allow it to cure with the metathesizable monomer. Another option for increasing the viscosity contemplates mixing the metathesizable monomer(s) in part A with thickening agents such as silica, talc, clay, organic modified clay, carbon black, and diatomaceous earth. The amount of thickener(s) added to part A depends upon the desired final viscosity, the viscosity of the thickener and the viscosity of the metathesizable material.

A crosslinking monomer may also be included in part A of the disclosed compositions in addition to the metathesizable material. One example of a suitable crosslinking monomer is a compound having at least two strained cycloolefins bonded directly or via a bridging group as described, for example, in U.S. Pat. No. 5,973,085, incorporated herein by reference. The crosslinking monomer may have a structure represented by $(A)_n$-B wherein A is a radical of a strained cycloolefin, B is a direct bond or an n-valent bridging group and n is an integer from 2 to 8 (e.g., 2 or 3). Illustrative cycloolefin radicals include unsubstituted or substituted cyclopropenyl, cyclobutenyl, cyclopentenyl, cycloheptenyl, cyclooctenyl, cyclopentadienyl, cyclohexadienyl, cycloheptadienyl, cyclooctadienyl and norbornenyl or norbornenyl derivatives. Illustrative bridging groups may have a structure represented by $-X^1-R^{10}-X^2-$ wherein:

(a) $X^1$ and $X^2$ are a direct bond and $R^{10}$ is $C_2-C_{18}$ alkylene, more particularly $C_2-C_{12}$ alkylene, or (b) $X^1$ and $X^2$ are $-O-$, $-CH_2-O-$, $-C(O)O-$, $-O(O)C-$, $-CH_2-O(O)C-$, $-O-C(O)-NH-$, or $-CH_2-O-C(O)-NH-$; and $R^{10}$ is $C_2-C_{12}$ alkylene, phenylene, naphthylene or benzylene that are substituted or unsubstituted.

Any catalyst that is capable of polymerizing the metathesizable material can be used in the disclosed adhesive or coating compositions. There are numerous known metathesis catalysts. Transition metal carbene catalysts are well known. Illustrative metathesis catalyst systems include rhenium compounds (such as $Re_2O_7/Al_2O_3$, $ReCl_5/Al_2O_3$, $Re_2O_7/Sn(CH_3)_4$, and $CH_3ReO_3/Al_2O_3-SiO_2$); ruthenium compounds (such as $RuCl_3$, $RuCl_3$(hydrate), $K_2[RuCl_5-H_2O]$, $[Ru(H_2O)_6](tos)_3$ ("tos" signifies tosylate), ruthenium/olefin systems (meaning a solution or dispersion of preformed complex between Ru and olefin (monomer) that also includes a β-oxygen in the presence or absence of a soluble or dispersed polymer where the polymer can be an oligomer or higher molecular weight polymer prepared by metathesis or other conventional polymerization synthesis), and ruthenium carbene complexes as described in detail below); osmium compounds (such as $OsCl_3$, $OsCl_3$(hydrate) and osmium carbene complexes as described in detail below); molybdenum compounds (such as molybdenum carbene complexes (such as t-butoxy and hexafluoro-t-butoxy systems), molybdenum pentachloride, molybdenum oxytrichloride, tridodecylammonium molybdate, methyltricaprylammonium molybdate, tri(tridecyl)ammonium molybdate, and trioctylammonium molybdate); tungsten compounds (such as tungsten carbene complexes (such as t-butoxy and hexafluoro-t-butoxy systems), $WCl_6$ (typically with a promoter such as $SnR_4$ (R signifies alkyl) or $PbR_4$), tungsten oxytetrachloride, tungsten oxide tridodecylammonium tungstate, methyltricaprylammonium tungstate, tri(tridecyl)ammonium tungstate, trioctylammonium tungstate, $WCl_6/CH_3CH_2OH/CH_3CH_2AlCl_2$, $WO_3/SiO_2/Al_2O_3$, $WCl_6/2,6-C_6H_5OH/SnR_4$, $WCl_6/2,6-Br-C_6H_3OH/SnR_4$, $WOCl_4/2,6-C_6H_5-C_6H_5OH/SnR_4$, $WOCl_4/2,6-Br-C_6H_3OH/SnR_4$); $TiCl_4$/aluminum alkyl; $NbO_x/SiO_2$/iso-butyl $AlCl_2$; and $MgCl_2$. As indicated above, some of these catalyst systems, particularly those involving tungsten, require the presence of additional activator or initiator systems (referred to herein as a "catalyst promoter") such as aluminum, zinc, lead or tin alkyl. A single catalyst or a mixture of catalysts may be used.

According to particular embodiments, the metathesis catalyst may be ruthenium, osmium or iridium carbene complexes having a structure represented by formula F:

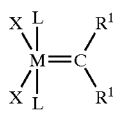

wherein M is Os, Ru or Ir; each $R^1$ is the same or different and is H, alkenyl, alkynyl, alkyl, aryl, alkaryl, aralkyl, carboxylate, alkoxy, allenylidenyl, indenyl, alkylalkenylcarboxy, alkenylalkoxy, alkenylaryl, alkynylalkoxy, aryloxy, alkoxycarbonyl, alkylthio, alkylsulfonyl, alkylsulfinyl, amino or amido; X is the same or different and is an anionic ligand group; and L is the same or different and is a neutral electron donor group. The carbon-containing substituents may have up to about 20 carbon atoms. Preferably, X is Cl, Br, I, F, CN, SCN, $N_3$, O-alkyl, or O-aryl. Preferably, L is a heterocyclic ring or $Q(R^2)_3$ wherein Q is P, As, Sb or N; $R^2$ is H, cycloalkyl, alkyl, aryl, alkoxy, arylate, amino, alkylamino, arylamino, amido or a heterocyclic ring; and a is 1, 2 or 3. Preferably, M is Ru; $R^1$ is H, phenyl ("Ph"), —CH=C(Ph)$_2$, —CH=C(CH$_3$)$_2$ or —C(CH$_3$)$_2$Ph; L is a trialkylphosphine such as $PCy_3$ (Cy is cyclohexyl or cyclopentyl), P(isopropyl)$_3$ or PPh$_3$; and X is Cl. Particularly preferred catalysts include tricyclohexyl phosphine ruthenium carbenes, especially bis(tricyclohexylphosphine)benzylidene ruthenium dichloride (designated herein by RuCl$_2$(PCy$_3$)$_2$=CHPh). Such ruthenium and osmium carbene catalysts are described, for example, in U.S. Pat. Nos. 5,312,940 and 5,342,909, both incorporated herein by reference; Schwab, P.; Grubbs, R. H.; Ziller, J. W., *Journal of the American Chemical Society*, 1996, 118, 100; Schwab, P.; France, M. B., Ziller, J. W.; Grubbs, R. H., *Angew. Chem. Int. Ed.*, 1995, 34, 2039; and Nguyen, S. T.; Grubbs, R. H., *Journal of the American Chemical Society*, 1993, 115, 9858. The catalysts of formula F have been found to be especially effective in formulating adhesive compositions that exhibit superior bonding.

Additional catalysts within formula F are those catalysts wherein the L groups are trialkylphosphines, imidazol-2-ylidene or dihydroimidazol-2-ylidene based systems, either mixed or the same. Examples of these catalysts include N,N'-disubstituted 4,5-dihydroimidazol-2-ylidene substituted ruthenium carbene, a N,N'-disubstituted imidazol-2-ylidene substituted ruthenium carbene, a mixed phosphine-dihydroimidazol-2-ylidene substituted ruthenium carbene or a mixed phosphine-imidazol-2-ylidene substituted ruthenium carbene. Particularly illustrative are tricyclohexylphosphine[1,3-bis(2,4,6-trimethylphenyl)-4,5-dihydroimidazol-2-ylidene][benzylidene]ruthenium dichloride (herein referred to as RuCl$_2$(PCy$_3$)(IHMes)=CHPh), or tricyclohexylphosphine[1,3-bis(2,3,6-trimethylphenyl)-4,5-imidazol-2-ylidene][benzylidene]ruthenium dichloride (herein referred to as RuCl$_2$(PCy$_3$)(IMes)=CHPh). The following are some useful catalysts (Cy=cyclohexyl, R$_2$=alkyl and aryl groups):

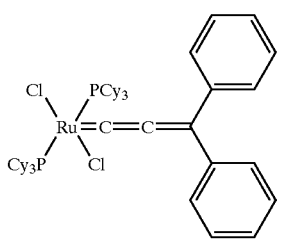

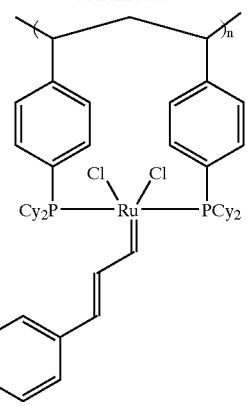

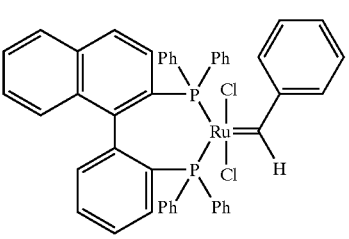

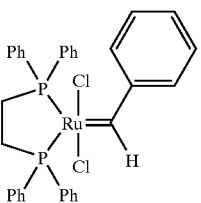
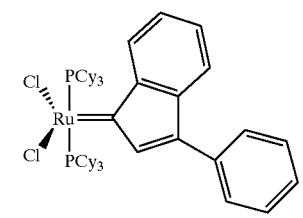

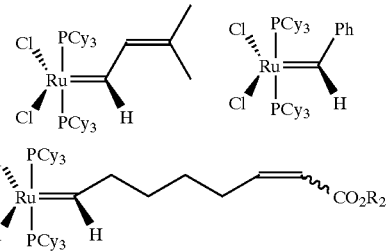

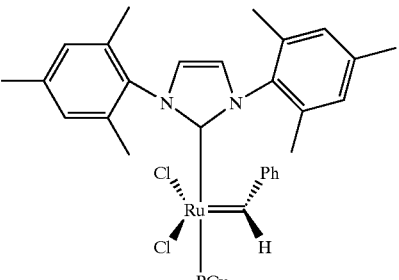
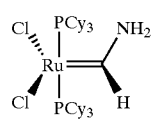

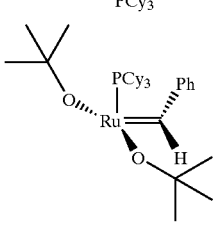
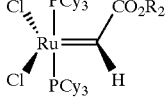

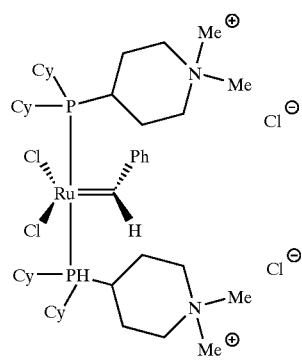
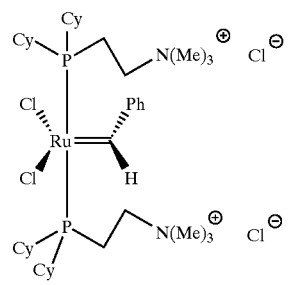
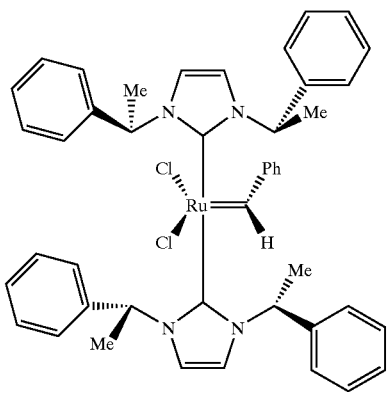
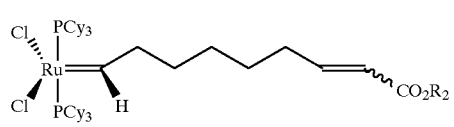
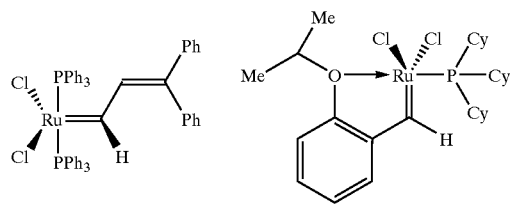
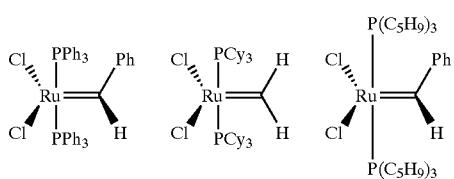
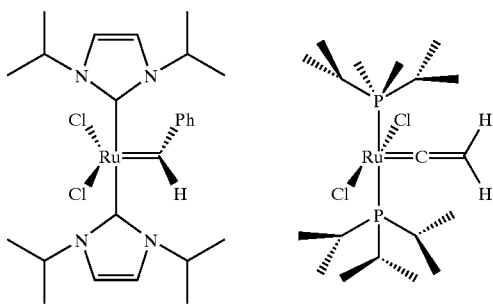
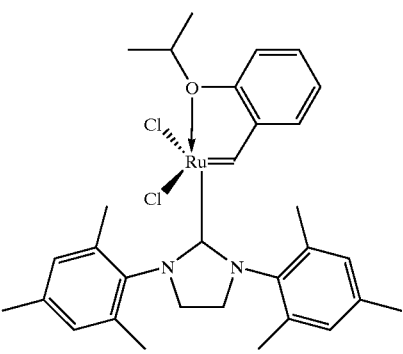
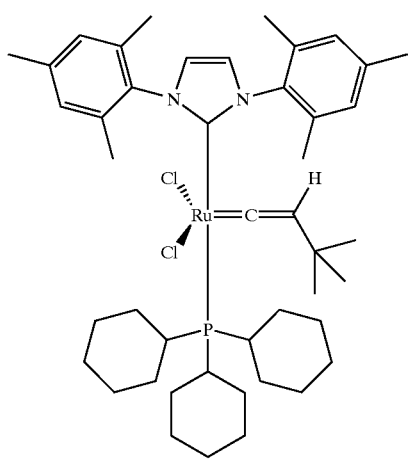
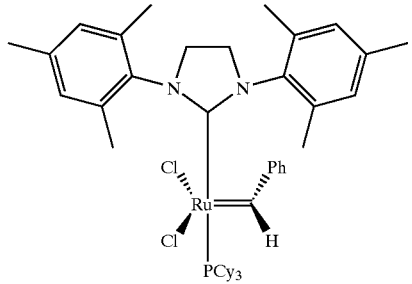

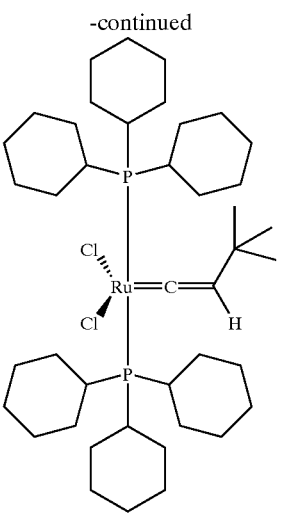

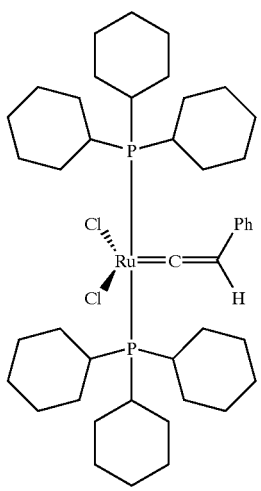

Useful catalysts are described in articles such as Ahmed, M.; Garrett, A. G. M.; Braddock, D. C.; Cramp, S. M.; Procopoiou, P. A. *Tetrahedron Letters*1999, 40, 8657; Olivan, M.; Caulton, K. G. *J. Chem. Soc., Chem. Commun.* 1997, 1733; Amoroso, D.; Fogg, D. E. *Macromolecules*2000, 33, 2815; Fürstner, A.; Hill, A. F.; Liebl, M.; Wilton-Ely, J. D. E. T. *J. Chem. Soc., Chem. Commun.*, 1999, 601; Robson, D. A.; Gibson, V. C.; Davies, R. G.; North, M. *Macromolecules*1999, 32, 6371; Schwab, P.; France, M. B.; Ziller, J. W.; Grubbs, R. H. *Angew. Chem. Int. Ed.* 1995, 34, 2039; Schwab, P.; Grubbs, R. H.; Ziller, J. W. *J. Am. Chem. Soc.* 1996, 118, 100; Ulman, M.; Belderrain, T. R.; Grubbs, R. H. *Tetrahedron Lett.* 2000, 4689; M. Scholl; S. Ding; C. W. Lee; Grubbs, R. H. *Organic Lett.* 1999, 1, 953; Scholl, M.; Trnka, T. M.; Morgan, J. P.; Grubbs, R. H. *Tetrahedron Lett.* 1999, 40, 2247; Belderrain, T. R.; Grubbs, R. H. *Organometallics*1997, 16, 4001; Ulman, M.; Belderrain, T. R.; Grubbs, R. H. *Tetrahedron Lett.* 2000, 4689; Sanford, M. S.; Henling, L. M.; Day, M. W.; Grubbs, R. H. *Angew. Chem. Int. Ed.* 2000, 39, 3451; Lynn, D. M.; Mohr, B.; Grubbs, R. H.; Henling, L. M.; Day, M. W. *J. Am. Chem. Soc.* 2000, 122, 6601; Mohr, B.; Lynn, D. M.; Grubbs, R. H. *Organometallics* 1996, 15, 4317; Nguyen, S. T.; Grubbs, R. H.; Ziller, J. W. *J. Am. Chem. Soc.* 1993, 115, 9858; Weskamp, T.; Schattenmann, W. C.; Spiegler, M.; Herrmann, W. A. *Angew. Chem. Int. Ed.* 1998, 37, 2490; Hansen, S. M.; Volland, M. A. O.; Rominger, F.; Eisentrager, F.; Hofmann, P. *Angew. Chem. Int. Ed.* 1999, 38, 1273; J. S. Kingsbury, J. S.; Harrity, J. P. A.; Bonitatebus, P. J.; Hoveyda, A. H. *J. Am. Chem. Soc.* 1999, 121, 791; Wolf, J.; Stuer, W.; Grunwald, C.; Werner, H.; Schwab, P.; Schulz, M. *Angew. Chem. Int. Ed.* 1998, 37, 1124; Gessler, S., Randl, S., Blechert, S., *Tetrahedron Lett.* 2000, 41, 9973; and U.S. Pat. No. 6,107,420.

Another ruthenium carbene complex that may be useful is a bimetallic catalyst having a structure represented by

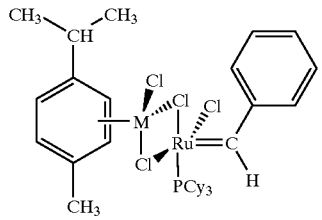

wherein M is Ru, Os or Rh. Such a catalyst is disclosed in Dias, E. L.; Grubbs, R. H., *Organometallics*, 1998, 17, 2758.

Illustrative molybdenum or tungsten catalysts include those represented by the formula:

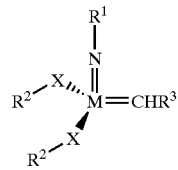

wherein M is Mo or W; X is O or S; $R^1$ is an alkyl, aryl, aralkyl, alkaryl, haloalkyl, haloaryl, haloaralkyl, or a silicon-containing analog thereof; $R^2$ are each individually the same or different and are hydrogen, alkyl, aryl, aralkyl, alkaryl, haloalkyl, haloaryl, haloaralkyl, or together form a heterocyclic or cycloalkyl ring; and $R^3$ is alkyl, aryl, aralkyl or alkaryl. Preferably, M is Mo; X is O; $R^1$ is phenyl-($R^5$) wherein $R^5$ is independently H, phenyl, isopropyl or alkyl and b=0 to 5; $R^2$ is —C(CH$_3$)$_3$, —C(CH$_3$)(CF$_3$)$_2$,

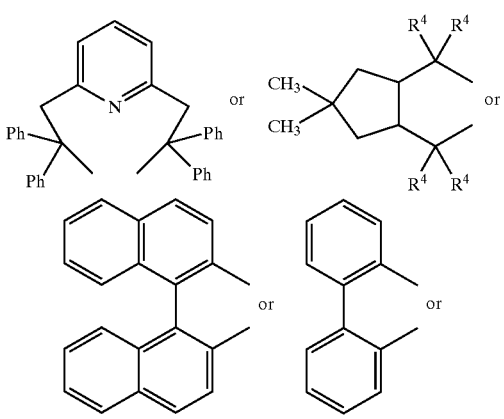

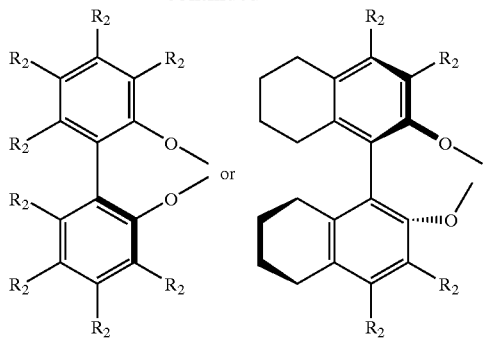

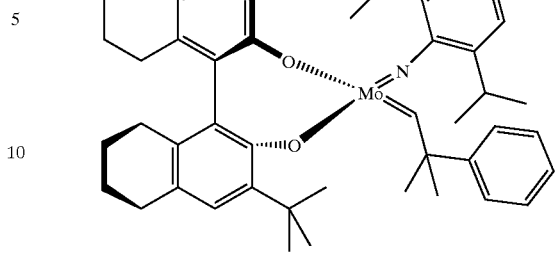

(wherein R[4] is phenyl, naphthyl, binaphtholate or biphenolate); and R[3] is —C(CH$_3$)$_2$C$_6$H$_5$. Particularly preferred are 2,6-diisopropylphenylimidoneophylidene molybdenum (VI) bis(hexafluoro-t-butoxide) (designated herein as "MoHFTB") and 2,6-diisopropylphenylimidoneophylidene molybdenum (VI) bis(t-butoxide) (designated herein as "MoTB"). Such molybdenum catalysts are described in Bazan, G. C.; Oskam, J. H.; Cho, H. N.; Park, L. Y.; Schrock, R. R., *Journal of the American Chemical Society*, 1991, 113, 6899; U.S. Pat. No. 4,727,215;

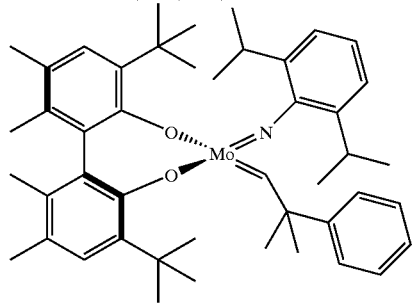

Alexander, B.; La, D. S.; Cefalo, D. R.; Hoveyda, A. H.; Schrock, R. R. *J. Am. Chem. Soc.* 1998, 120, 4041; Zhu, S.; Cefalo, D. R.; La, D. S.; Jamieson, J. Y.; Davis, W. M.; Hoveyda, A. H.; Schrock, R. R. *J. Am. Chem. Soc.* 1999, 121, 8251; and Aeilts, S. L.; Cefalo, D. R.; Bonitatebus, Jr., P. J.; Houser, J. H.; Hoveyda, A. H.; Schrock, R. R. *Angew. Chem. Int. Ed.* 2001, 40, 1452. Illustrative examples are given below:

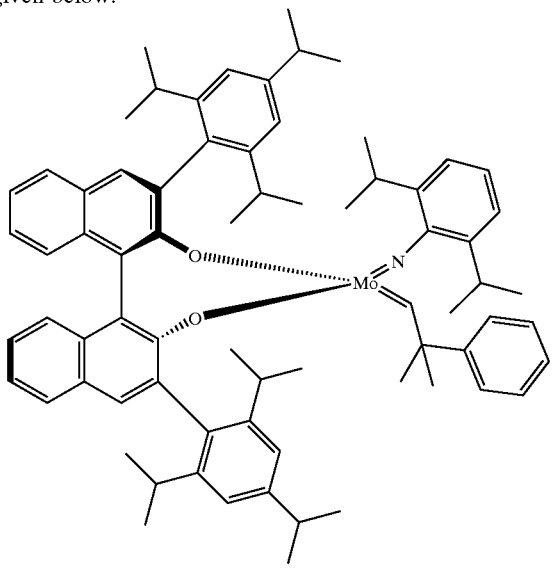

In the two-part systems the catalyst typically is included in part B. The catalyst in its substantially pure form may exist as a liquid or solid at normal ambient conditions. If the catalyst exists as a liquid, it may be mixed with a carrier fluid in order to dilute the concentration of the catalyst. If the catalyst exists as a solid, it may be mixed with a carrier fluid so that it can be easily mixed into the adhesive or coating composition. For example, the RuCl$_2$(PCy$_3$)$_2$=CHPh, RuCl$_2$(PCy$_3$)(IMes)=CHPh, RuCl$_2$(PCy$_3$)(IHMes)=CHPh, homobimetallic ruthenium, MoHFTB and MoTB catalysts exist as solids at normal ambient conditions and thus are usually mixed with carrier fluids.

The catalyst may be dispersed, suspended or dissolved in the carrier fluid. The carrier fluid may be water or any conventional organic solvent such as dichloroethane, toluene, methyl ethyl ketone, acetone, tetrahydrofuran, N-methyl pyrrolidone, 3-methyl-2-oxazolidinone, 1,3-dimethylethyleneurea, 1,3-dimethylpropyleneurea and supercritical carbon dioxide. Polar organic and aqueous carrier systems are useful for ruthenium, osmium and iridium catalysts.

As mentioned above, the disclosed adhesive or coating compositions are especially useful for bonding or coating low-surface-tension substrates. Obtaining sufficient surface wetting of the low-surface-tension substrate surface by the adhesive or coating is important for achieving strong bonding.

One option for accomplishing the desired wetting is to employ a high molecular weight fluid as the catalyst carrier. Illustrative high molecular weight fluids include silicone oils, mineral oils, paraffin oils, silicone copolymers, white oils, hydraulic oils, transformer oils, halogenated organic liquids (such as chlorinated hydrocarbons, halogenated paraffins, perfluorinated polyethers and fluorinated hydrocarbons) diesters, polyoxyalkylenes, fluorinated silicones, cyanoalkyl siloxanes, glycols, and synthetic hydrocarbon oils (including both unsaturated and saturated).

Another option for obtaining adequate wetting is to employ as the catalyst carrier cycloolefin fluids having a sufficiently low ring-strain energy so that they tend to only oligomerize or partially polymerize in the presence of the metathesis catalyst under normal ambient conditions. The resulting metathesis oligomers or polymers remain in a liquid or paste form under normal ambient conditions. Since the metathesis oligomers or polymers exist as a liquid or paste they can flow through the described dispensing systems. Such cycloolefins also provide the desired wetting and can at least partially co-polymerize with the metathesis material in part A. Co-polymerization of the carrier fluid means that it is a reactive component that is incorporated into the structure of the cured adhesive or coating (i.e., the cycloolefin carrier fluid is part of the "solids" content of the composition). Incorporation of the cycloolefins into the cured adhesive or coating structure avoids any potential problems with migration of non-incorporated carrier fluid components to the surface of the coating or the adhesive-substrate interface.

Any cycloolefin having the characteristics described above may be used as the catalyst carrier fluid. Exemplary cycloolefins include, but are not limited to cyclopentene, cyclohexene, and their substituted derivatives such as 3-ethylcyclopentene, 8-methoxy tricyclo[5.2.1.0$^{2,6}$]-4-decene, 4-methylcyclohexene, and 4-methoxymethylcyclohexene.

A further particular catalyst embodiment involves a two-part catalyst system that requires a catalyst promoter as described above. For example, many of the tungsten catalyst systems require the presence of additional promoter systems such as aluminum, zinc, lead or tin alkyl in order to effect metathesis polymerization. A stable two-part adhesive system can be formulated by including the promoter in part A and the catalyst in part B. In such systems, any type of metathesizable material can be included in part B in the presence of the catalysts alone since the metathesizable material will not polymerize until the catalyst in part B is contacted with the promoter in part A.

Another optional component in the catalyst-containing part B is the thickener described above in connection with part A. For example, a thickening polymer or polymer toughening agent may be included in part B. Such thickeners may be present in both parts A and B or in one of the parts alone.

According to a particular embodiment, Part B of a two-part system may have a viscosity of at least about 10 cP at 25° C. The desired viscosities can be achieved by formulating part B with certain carrier fluids and/or thickeners as described above.

Additional optional additives may be included in the compositions disclosed herein such as, for example, colorants, fillers, pigments such as titanium dioxide and carbon black, and extenders such as calcium carbonate, Wollastonite, and talc.

Illustrative embodiments of parts A and B of a two-part system are described below. "Weight percent" referred to in these embodiments is based upon the total weight of each part. Part A may include:

(a) about 20 to about 100, more particularly about 40 to about 95, wt. % first metathesizable monomer/oligomer;

(b) 0 to about 50, more particularly about 5 to about 40 wt. % second metathesizable monomer/oligomer if the first metathesizable monomer/oligomer is a norbornadiene;

(c) 0 to about 50, more particularly about 10 to about 40, wt. % thickening polymer or thickening agent;

(d) 0 to about 40 wt. % carrier fluid(s), particularly for the first and/or second metathesizable monomer/oligomer;

(e) 0 to about 10 wt. % of a promoter for the metathesis catalyst in part B;

(f) 0 to about 10 wt. % of a thickening agent; and (g) 0 to about 10 wt. % microspheres.

Part B may include:

(a) about 0.001 to about 25, more particularly about 0.1 to about 10, wt. % metathesis catalyst(s);

(b) about 40 to about 99.999, more particularly about 60 to about 99.9, wt. % carrier fluid(s), particularly for the metathesis catalyst;

(c) about 0 to about 50, more particularly about 0 to about 30, wt. % polymer thickener;

(d) 0 to about 10 wt. % thickening agent; and (e) 0 to about 10 wt. % microspheres.

The compositions may also be provided in the form of one-part compositions. For example, a solid metathesizable material can be mixed or dispersed in a metathesis catalyst/carrier solution. The resulting mixture can be heated above the melting point of the solid metathesizable material when the mixture is applied to a substrate for bonding. The heating of the mixture would allow the metathesis catalyst to polymerize the liquid metathesizable material thus effecting bonding of the substrate to another substrate.

Another one-part composition can be realized when a catalyst that requires thermal activation is used. For example, U.S. Pat. No. 6,107,420 discloses ruthenium and osmium catalyst that require thermal activation. These catalysts can be placed in at least one metathesizable monomer as a one-part adhesive. The one-part adhesive mixture is then applied to at least one substrate for bonding. Heating this mixture to a temperature at which the catalyst becomes an active catalyst would allow the active catalyst to polymerize the liquid metathesizable material, thus effecting bonding of the substrate to another substrate.

An important characteristic of the disclosed adhesive systems is the open time. One benefit of the disclosed compositions is the ability to be conveniently dispensed as a two-part system that cures at an extremely fast rate at room temperature or elevated temperatures for high speed operation. For example, in the two-part system the open time after mixing part A with part B can be about 1 to about 120 seconds, particularly about 1 to about 20 seconds. Although fast cure rates may be desirable, providing sufficient open time may be particularly difficult for a metathesis polymer adhesive or coating since the metathesis reaction, especially ROMP, can occur very quickly if it is not controlled in some manner (e.g. about 1 to about 5 seconds for norbornadiene). As detailed above, one option for controlling the polymerization rate is to mix together two different metathesizable monomers wherein one monomer has a high reactivity and the other monomer has a lower reactivity.

Another avenue for adjusting the open time is carefully selecting the amount of catalyst relative to the amount of metathesizable material. The relative amounts of metathesizable material and catalyst should be selected to balance the bonding strength with the open time. The specific amounts vary depending upon a variety of factors including substrate type, desired properties, catalyst activity and metathesizable material reactivity. In general, for example, the amount of all metathesizable materials in the overall adhesive or coating system relative to the amount of catalyst may range from about 20:1 to about 100,000:1, more particularly from about 100:1 to about 10,000:1, on a molar ratio basis. In certain embodiments that include a ruthenium, molybdenum or tungsten carbene catalyst in part B and at least two metathesizable monomers in part A, the relative amount of monomer to catalyst may range from about 10:1 to about 5000:1, on a molar ratio basis.

In the embodiments with ruthenium and osmium carbene catalysts, the open time could further be extended by addition of additional phosphine ligands, such as triphenylphosphine or tricyclohexylphosphine.

A further significant advantage is that certain embodiments of the composition are environmentally acceptable. The disclosed compositions may be substantially about 100% solids. In other words, neither part of the two-part systems includes any substantial liquid amount that does not react upon use of the adhesive or coating to form a solid, cured adhesive or coating. In particularly, the catalyst can be delivered to the substrate surface with a reactive carrier fluid as described above. Substantially pure or technical grade metathesizable monomer/oligomer can be used and the monomer/oligomer is substantially 100% reactive. Alternatively, an aqueous carrier fluid may be used for the catalyst and/or metathesizable monomer/oligomer. Consequently, there are substantially no volatile organic compounds used according to certain embodiments. The adhesive compositions, however, may include organic solvents or organic suspending agents as carrier fluids for the active ingredients as described above. The carrier fluid(s) can be capable of evaporating from the mixed adhesive composition under normal ambient conditions or upon heating.

According to particular embodiments, the pre-mixed compositions (i.e., parts A and B) may be stable for a reasonable period of storage time prior to use (referred to herein as "shelf life"). As used herein, "stable" means that the ingredients of parts A and B of the two-part system do not degrade or react to any significant extent in the presence of normal ambient conditions. For example, parts A and B can have a shelf life of up to about 3 months, particularly up to about 6 months. The disclosed compositions offer numerous other ease-of-use advantages. The metathesis polymerization or curing may occur under normal ambient conditions in air regardless of whether moisture is present. An exterior energy source (e.g., radiation, thermal or photochemical) for curing the adhesive or coating is not required, but such energy source may desirably increase the cure rate.

The types of substrate surfaces that can be coated or bonded with the disclosed compositions vary widely. Such substrates could include machined parts made from metal and elastomers, molded articles made from elastomers or engineering plastics, extruded articles such as fibers or parts made from thermoplastics or thermosets, sheet or coil metal goods, fiberglass, wood, paper, ceramics, glass and the like.

Illustrative elastomer substrates include natural rubber or synthetic rubber such as polychloroprene, polybutadiene, polyisoprene, styrene-butadiene copolymer rubber, acrylonitrile-butadiene copolymer rubber ("NBR"), ethylene-propylene copolymer rubber ("EPM"), ethylene-propylene-diene terpolymer rubber ("EPDM"), butyl rubber, brominated butyl rubber, alkylated chlorosulfonated polyethylene rubber, hydrogenated nitrile rubber ("HNBR"), silicone rubber, fluorosilicone rubber, poly(n-butyl acrylate), thermoplastic elastomer and the like as well as mixtures thereof.

Illustrative engineering plastic substrates useful in the invention include polyester, polyolefin, polyamide, polyimide, polynitrile, polycarbonate, acrylic, acetal, polyketone, polyarylate, polybenzimidazoles, polyvinyl alcohol, ionomer, polyphenyleneoxide, polyphenylenesulfide, polyaryl sulfone, styrenic, polysulfone, polyurethane, polyvinyl chloride, epoxy and polyether ketones.

Illustrative metal substrates include iron, steel (including stainless steel and electrogalvanized steel), lead, aluminum, copper, brass, bronze, MONEL metal alloy, nickel, zinc, tin, gold, silver, platinum, palladium and the like.

Illustrative fiber substrates include fiberglass, polyester, polyamide (both nylon and aramid), polyacrylonitrile, polyethylene, polypropylene, carbon, rayon, cotton, silicon carbide, and boron nitride.

Illustrative fiber-reinforced or -impregnated composite substrates include fiberglass-reinforced prepreg ("FRP"), sheet molding compound ("SMC") and fiber-reinforced elastomer composites. In the case of fiber-reinforced elastomer composites, fiber substrates can be sandwiched between and bonded to outer elastomer layers to form a composite multilayer composite structure such as tires, belts for the automotive industry, hoses, air springs and the like. The adhesives also can be used to bond fiber-reinforcing cord to tire materials.

The composition is particularly useful for coating a low-surface-tension substrate or as a structural adhesive for bonding a low-surface-tension substrate to another substrate (which may or may not be another low-surface-tension substrate). Illustrative low-surface-tension substrates include fluorinated polymers such as polytetrafluoroethylene. Polyolefin substrates are another class of common low-surface-tension substrates. Illustrative polyolefins include homopolymers of alpha-olefins such as ethylene, propylene, 1-butene, 1-hexene and 4-methyl-1-pentene and copolymers of ethylene with one or more alpha-olefins. Exemplary polyolefins include low-density polyethylene, linear low-density polyethylene, medium- and high-density polyethylene, polypropylene, and propylene-ethylene random or block copolymers.

A further class of low-surface-tension substrates are cured or post-vulcanized elastomers. Examples of such elastomers are described above. One particular class of low-surface-tension elastomer is thermoplastic elastomers such as SANTOPRENE®. SANTOPRENE® is the trade designation of a thermoplastic elastomer ("TPE") commercially available from Advanced Elastomer Systems that consists of elastomer particles dispersed throughout a continuous matrix of thermoplastic material. Such TPE blends are described in detail in U.S. Pat. No. 5,609,962, incorporated herein by reference. As used herein, TPE also includes thermoplastic olefins ("TPO") such as those described in U.S. Pat. No. 5,073,597, incorporated herein by reference.

The two-part system can be used by mixing together pre-mixed parts A and B and applying the mixed adhesive or coating onto a substrate surface. Particular embodiments of the two-part system are especially useful for applying via two known dispensing systems as described below. The two-part system can be provided to a customer as a product that includes part A in a first container and part B in a second container for use in these or similar dispensing systems.

One dispensing system is referred to herein as a "meter mix" system. In general, meter mix systems include at least two containers for storing the respective parts of the adhesive system, means for displacing (e.g., via pumping) the compositions from the container, an element for mixing the two parts together, and means for applying the mixed composition to a substrate surface. One example of a meter mix system is described in U.S. Pat. No. 6,074,506, incorporated herein by reference, and shown in FIG. 1.

In particular, FIG. 1 depicts an illustrative adhesive dispensing system 10. The system 10 includes a first container 13, a second container 14, a fluid-flow-control (i.e., metering) device 19, and a dispensing gun 26. The adhesive is a two-part adhesive that includes a first composition or part 11 and a second composition or part 12. The two-part adhesive system may be any of those described above. For example, the metathesis catalyst may be included in the second composition 12 and the metathesizable monomer/oligomer may be included in the first composition 11. The first container 13 contains first composition 11 and the second container 14 contains second composition 12. A first supply tube 17 is in fluid communication with first composition 11 and a first metering chamber 18 defined in fluid-flow-control device 19. A second supply tube 17 is in fluid communication with second composition 12 and a second metering chamber 22 defined in fluid-flow-control device 19. A first application tube 24 is in fluid communication with the fluid-flow-control device 19 and the dispensing gun 26. A second application tube 25 is in fluid communication with the fluid-flow-control device 19 and the dispensing gun 26. Left and right halves (not shown) may be defined within dispensing gun 26 for receiving first and second compositions 11, 12. The dispensing gun 26 may be operated by compressed air as is known in the art. A mixing nozzle 27 is affixed to the dispensing end of the dispensing gun 26. The mixing nozzle 27 may define a series of baffles or helical mixing elements 29 and an exit orifice 30.

The first and second compositions 11, 12 flow through the first and second supply tubes 17, 21 and into the fluid-flow-control device 19. First composition 11 and second composition 12 are then displaced from first and second metering chambers 18, 22, respectively, through exit orifices (not shown) and into application tubes 24, 25. The first and second compositions 11, 12 then flow via the dispensing gun 26 through the mixing elements 29 of the mixing nozzle 27. The resulting adhesive mixture is expressed from the exit orifice 30 and is applied to a substrate.

Any suitable means for propelling the first and second compositions 11, 12 through the adhesive dispensing system 10 may be employed. For example, first and second pumps 15, 16 may be provided for pumping the first composition 11 and the second component 12 from first and second containers 13, 14, respectively, and into the fluid-flow-control device 19. The fluid-flow-control device 19 may include various mechanisms as is known in the art (such as displacement rods 28) for delivering precision amounts of compositions to the dispensing gun 26.

Another example of a dispensing system is a cartridge/static mixer as described, for example, in U.S. Pat. Nos. 5,082,147; 4,869,400; 4,767,026; and 3,664,639 (all incorporated herein by reference) and German Utility Patent No. 68501010 (published Dec. 5, 1985). FIG. 2 depicts one embodiment of a cartridge/static mixer system as described in U.S. Pat. No. 4,767,026.

In particular, the system of FIG. 2 includes a cartridge 40 defining two parallel chambers 41, each having an exit-side surface 44. A piston 42 may be received respectively in each chamber 41. The pistons 42 may be coupled to driving rods (not shown) and a trigger (not shown) as is found, for example, in a caulking gun. Each chamber 41 defines an outlet orifice (not shown) in the exit-side surface 44. A nozzle 43 is located in contact with the exit-side surface 44. The nozzle 43 defines two outlet passages 45 that are in fluid communication with the outlet orifices in the exit-side surfaces 44. A fluid conduit 47 is engaged with the nozzle 43 via a flange 48 that may be rotationally received in, and locked by, locking tabs 49. A static mixer 46 is received within fluid conduit 47. The static mixer 46 defines a series of mixing elements 51. The fluid conduit defines an exit orifice 50 at the end away from the nozzle 43.

During operation, one part of the two-part adhesive or coating system is loaded into each chamber 41, respectively. The pistons 42 are advanced into the chambers 41, thus forcing each of the one-part compositions through an outlet passage 45. Each one part composition exits the outlet passage 45 and are mixed together by the mixing elements 51 as the composition travels along the length of the static mixer 46. The mixed adhesive or coating composition then exits via exit orifice 50 and is applied to a substrate surface.

The specific examples described below are for illustrative purposes and should not be considered as limiting the scope of this disclosure. All ingredients of each part of the adhesive system were mixed together by hand in a plastic beaker. The silica was slowly added until the desired consistency was reached. Percentages are weight percents unless indicated otherwise. The ENB, NBD, cyclopentene and cyclohexene were obtained from Aldrich, 5,6-bis(chloromethyl)-2-norbornene was synthesized according to the procedure of Shahada, L. A.; and Feast, W. J. *Eur. Polym. J.* 1990, 26, 25–27, the styrene-isoprene elastomer was Europrene Sol T193-A available from Enichem S. p. A., the silica was Cab-O-Sil HS-5 available from Cabot Corp., the $RuCl_2(PCy_3)_2$=CHPh catalyst was obtained from Boulder Scientific Company, the paraffin oil was Worthpar 100 available from Worth Chemical Co., the glass beads were Zeospheres W1600 obtained from 3M, and the tricyclohexylphosphine (1,3-dimesityl-4,5-dihydroimidazol-2-ylidene)benzylidene ruthenium dichloride catalyst was synthesized according to Scholl, M.; Ding, S.; Lee, C. W.; Grubbs, R. H. *Org. Lett.* 1999, 1, 953.

Parts A and B were placed into the respective sides of an adhesive-dispensing cartridge in a 10:1 volume ratio and dispensed via a static mix tube. Parts A and B of each example were dispensed via a cartridge/static mixer onto either an untreated or lightly sanded (with 100 grit sandpaper) polypropylene coupon that was then contacted with another untreated or lightly sanded (with 100 grit sandpaper) polypropylene coupon to make samples for lap shear testing per procedures known in the art. The mean stress at break of the lap shear samples was measured (in psi) by pulling the samples apart using an Instron tester or United Calibration Corporation tester per procedures known in the art. The failure mode was determined by visual inspection.

EXAMPLES 1 AND 2

A two-part adhesive system was made with the following ingredients:

| Part A: | | Part B: | |
|---|---|---|---|
| ENB | 40.6% | $RuCl_2(PCy_3)_2$=CHPh | 15.5% |
| NBD | 40.6% | Paraffin oil | 84.5% |
| Styrene-isoprene elastomer | 14.3% | | |
| Silica | 4.5% | | |

Example 2 had the same ingredients as listed above except that Part B consisted of 7.7% $RuCl_2(PCy_3)_2$=CHPh and 92.3% paraffin oil. Two sets of lap shear samples from untreated polypropylene were prepared using Example 1 (5 mil width bond line and 10 mil width bond line) and one set was prepared using Example 2 (10 mil width bond line). All samples cured in about 10 seconds and formed an adhesive bond. The test results were as follows:

| | | |
|---|---|---|
| Example 1 (10 mil) | Mean stress break - 96 psi | Adhesive failure mode |
| Example 1 (5 mil) | Mean stress break - 94 psi | Adhesive failure mode |
| Example 2 (10 mil) | Mean stress break - 106 psi | Adhesive failure mode |

EXAMPLES 3–11

Part A of a two-part adhesive system was made with the following ingredients:

| | |
|---|---|
| ENB | 45% |
| NBD | 30% |
| Styrene-isoprene elastomer | 15% |
| Glass beads | 8% |
| Silica | 4.5% |

Part B was made with following ingredients in weight percents shown in the table below. The mean stress at break results of lap shear samples made with untreated polypropylene substrates are also provided in the table.

| | Ex. No. | | | | | | | | |
|---|---|---|---|---|---|---|---|---|---|
| Ingredient | 3 | 4 | 5 | 6 | 7 | 8 | 9 | 10 | 11 |
| $RuCl_2(PCy_3)_2$=CHPh | 4.1 | 2.9 | 2.2 | 1.6 | 0.7 | 2.1 | 1.6 | 7.7 | 0.7 |
| Cyclohexene | 77 | 78 | 78 | 80 | 80 | 47 | 48 | 0 | 0 |
| Cyclopentene | 0 | 0 | 0 | 0 | 0 | 47 | 48 | 92 | 95 |
| Silica | 4 | 4 | 4 | 2 | 4 | 4 | 2 | 0 | 4 |
| Styrene-isoprene | 15 | 15 | 16 | 16 | 16 | 0 | 0 | 0 | 0 |
| Mean stress (psi) | 224 | 128 | 100 | 11 | 7 | 4 | 11 | 232 | 7 |

EXAMPLES 12 AND 13

Part A is the same as in Examples 3–11, but for Example 12 part B consists of 2.5% tricyclohexylphosphine(1,3-dimesityl-4,5-dihydroimidazol-2-ylidene)benzylidene ruthenium dichloride catalyst, 92.5% cyclohexene, and 5.0% silica and for Example 13 part B consists of 1.2% tricyclohexylphosphine(1,3-dimesityl-4,5-dihydroimidazol-2-ylidene)benzylidene ruthenium dichloride catalyst, 93.8% cyclohexene and 5.0% silica. Polypropylene-substrate lap-shear samples for Example 12 had a mean stress at break of 419 psi and Example 13 had a mean stress at break of 32 psi.

EXAMPLE 14

A solution of 34 mg of tetrachloro bis(2,6-diphenylphenoxy)tungsten catalyst in 0.4 g 5,6-bis(chloromethyl)-2-norbornene monomer was spread over two sanded polypropylene coupons. Two opposing polypropylene coupons were coated with a solution of 30 mg tetrabutyl tin (catalyst promoter) in 0.4 g 5,6-bis(chloromethyl)-2-norbornene monomer. The coupon pairs were mated and allowed to cure for 24 hours to make lap shear samples. The mean stress at break was 196 psi.

EXAMPLE 15

One side of a cartridge was filled with 136 mg tetrachloro bis(2,6-diphenylphenoxy)tungsten catalyst and 40 mg poly(ENB) dissolved in 1 g 5,6-bis(chloromethyl)-2-norbornene monomer. The other side of the cartridge was filled with a solution 0.05 mL tetrabutyl tin (catalyst promoter) and 40 mg poly(ENB) in 1 g 5,6-bis(chloromethyl)-2-norbornene monomer. The compositions were dispensed from the cartridge onto six sanded polypropylene coupons that were then prepared as lap shear samples. Four lap shear samples fell apart by hand, one broke with a stress of 57 psi and the other broke with a stress of 217 psi. The samples that fell apart by hand were not fully cured probably due to incomplete mixing of the catalyst and the catalyst promoter.

Having illustrated and described the principles of the disclosed embodiments, it should be apparent to those of ordinary skill in the art that the embodiments may be modified in arrangement and detail without departing from such principles.

What is claimed is:

1. A two-part reactive adhesive system dispensed from separate compartments in said system, said parts intermixing upon dispensing, and comprising:
   (a) a first part comprising at least one first metathesizable material; and
   (b) a second part comprising (i) at least one liquid metathesis oligomer or polymer and (ii) at least one metathesis catalyst.

2. A two-part system according to claim 1, wherein the liquid metathesis oligomer or polymer comprises an oligomer or polymer of cyclopentene, cyclohexene, 3-ethylcyclopentene, 8-methoxy tricyclo[$5.2.1.0^{2,6}$]-4-decene, 4-methylcyclohex and 4-methoxymethylcyclohexene.

3. A two-part system according to claim 1, wherein the first metathesizable material comprises at least one highly-reactive cycloolefin.

4. A two-part system according to claim 1, wherein the first metathesizable material is selected from norbornadiene, norbornene and cyclobutene.

5. A two-part system according to claim 2, wherein the first metathesizable material comprises at least one norbornadiene.

6. A two-part system according to claim 5, wherein the first part further comprises at least one other cycloolefin.

7. A two-part system according to claim 1, wherein the metathesis catalyst comprises a compound having a structure represented by

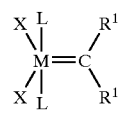

wherein M is Os, Ru or Ir; each $R^1$ is the same or different and is H, alkenyl, alkynyl, alkyl, aryl, alkaryl, aralkyl, carboxylate, alkoxy, allenylidenyl, indenyl, alkylalkenylcarboxy, alkenylalkoxy, alkenylaryl, alkynylalkoxy, aryloxy, alkoxycarbonyl, alkylthio, alkylsulfonyl, alkylsulfinyl, amino or amido; X is the same or different and is an anionic ligand group; and L is the same or different and is a neutral electron donor group; or having a structure represented by

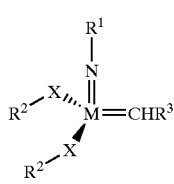

wherein M is Mo or W; X is O or S; $R^1$ is an alkyl, aryl, aralkyl, alkaryl, haloalkyl, haloaryl, haloaralkyl, or a silicon-containing analog thereof; $R^2$ are each individually the same or different and are hydrogen, alkyl, aryl, aralkyl, alkaryl, haloalkyl, haloaryl, haloaralkyl, or together form a heterocyclic or cycloalkyl ring; and $R^3$ is alkyl, aryl, aralkyl or alkaryl.

8. A two-part system according to claim 1, wherein the first part further comprises a catalyst promoter.

9. A two-part reactive adhesive or coating system comprising:
   (a) a first part comprising at least one first metathesizable material; and
   (b) a second part prepared by mixing together at least one metathesis catalyst and at least one metathesizable monomer that forms a liquid metathesis oligomer or polymer in the presence of the metathesis catalyst.

10. A two-part system according to claim 9, wherein the metathesizable monomer is selected from cyclopentene, cyclohexene, 3-ethylcyclopentene, 8-methoxy tricyclo[$5.2.1.0^{2,6}$]-4-decene, 4-methylcyclohexene, and 4-methoxymethylcyclohexene.

11. A two-part system according to claim 9, wherein the first metathesizable material is selected from norbornadiene, norbornene and cyclobutene.

12. A two-part reactive adhesive or coating system comprising:
   (a) a pre-mixed first part comprising at least one metathesizable material comprising a highly-reactive cycloolefin; and
   (b) a pre-mixed second part comprising at least one metathesis catalyst and a liquid diluent carrier.

13. A two-part system according to claim 12, wherein the metathesizable material is selected from norbornadiene, norbornene and cyclobutene.

14. A two-part reactive adhesive or coating product comprising:
   (a) a first container containing a first composition having a viscosity of at least about 10 cP at 25° C. and comprising at least one metathesizable material; and
   (b) a second container containing a second composition having a viscosity of at least about 10 cP at 25° C. and comprising at least one metathesis catalyst.

15. A two-part adhesive or coating product according to claim 14, wherein the first composition and the second composition have a shelf life of at least about 3 months.

16. A two-part adhesive or coating product according to claim 14, wherein at least one of the first and the second composition further comprises at least one thickening additive.

* * * * *